United States Patent
Magno, Jr. et al.

(10) Patent No.: US 9,340,339 B2
(45) Date of Patent: May 17, 2016

(54) CABLE TIE WITH DISSIMILAR MATERIAL BARB

(75) Inventors: Joey D. Magno, Jr., Cordova, TN (US); Rasoul Shouri, Ooltewah, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 501 days.

(21) Appl. No.: 13/571,836

(22) Filed: Aug. 10, 2012

(65) Prior Publication Data

US 2013/0081232 A1   Apr. 4, 2013

Related U.S. Application Data

(60) Provisional application No. 61/541,455, filed on Sep. 30, 2011.

(51) Int. Cl.
| | |
|---|---|
| *B28B 7/22* | (2006.01) |
| *B65D 63/00* | (2006.01) |
| *B65D 63/10* | (2006.01) |
| *B29C 45/16* | (2006.01) |
| *B29L 31/00* | (2006.01) |

(52) U.S. Cl.
CPC ............ *B65D 63/1063* (2013.01); *B29C 45/16* (2013.01); *B29C 45/162* (2013.01); *B29C 45/1676* (2013.01); *B29L 2031/7276* (2013.01); *Y10T 24/1498* (2015.01)

(58) Field of Classification Search
CPC .... B65D 63/16; B65D 63/1018; B65D 63/10; B65D 63/1063
USPC ................ 24/16 PB, 17 AP, 30.5 P, 24, 20 S; 248/74.3
See application file for complete search history.

(56) References Cited

U.S. PATENT DOCUMENTS

| 4,191,334 | A |   | 3/1980 | Bulanda |
|---|---|---|---|---|
| 4,458,385 | A | * | 7/1984 | Espinoza ................... 24/16 PB |
| 4,510,650 | A |   | 4/1985 | Espinoza |
| 4,813,105 | A |   | 3/1989 | Espinoza |
| 4,993,669 | A |   | 2/1991 | Dyer |
| 5,230,541 | A | * | 7/1993 | Nowak .......................... 292/288 |
| 6,185,791 | B1 | * | 2/2001 | Khokhar .................... 24/16 PB |
| 6,863,855 | B2 | * | 3/2005 | Shilale ............. B29C 45/14336 |
|   |   |   |   | 264/148 |
| 7,259,674 | B2 | * | 8/2007 | Marsilio et al. ............. 340/572.1 |
| 8,156,771 | B2 | * | 4/2012 | Kostal et al. ....................... 70/16 |
| 2004/0250950 | A1 | * | 12/2004 | Dubrow ....................... 156/276 |
| 2007/0119030 | A1 | * | 5/2007 | Hoffman et al. ............ 24/16 PB |
| 2007/0180870 | A1 | * | 8/2007 | DePetrillo .......................... 70/16 |
| 2008/0143007 | A1 | * | 6/2008 | Tuma ............................... 264/78 |
| 2008/0196215 | A1 | * | 8/2008 | Canady .............. B65D 63/1054 |
|   |   |   |   | 24/16 PB |
| 2008/0229550 | A1 | * | 9/2008 | Elsner ......................... 24/16 PB |
| 2008/0296444 | A1 | * | 12/2008 | Geiger ............................ 248/71 |
| 2013/0031751 | A1 | * | 2/2013 | Bartholomew .... B65D 63/1045 |
|   |   |   |   | 24/16 PB |

FOREIGN PATENT DOCUMENTS

| CA | 2694346 A1 | 12/2008 |
|---|---|---|
| CN | 101608062 A | 12/2009 |

* cited by examiner

*Primary Examiner* — Robert J Sandy
*Assistant Examiner* — Matthew Sullivan
(74) *Attorney, Agent, or Firm* — Snyder, Clark, Lesch & Chung, LLP

(57) ABSTRACT

A cable tie includes a body of a first material molded over at least one barb of a second material. The body includes a head section configured to secure the barb in a configuration that permits rotational movement of the barb, permit insertion of a tail section into the head section, and prevent extraction of the tail section from the head section by engagement of the barb. In one implementation, the cable tie is manufactured using a multi-shot molding process.

20 Claims, 14 Drawing Sheets

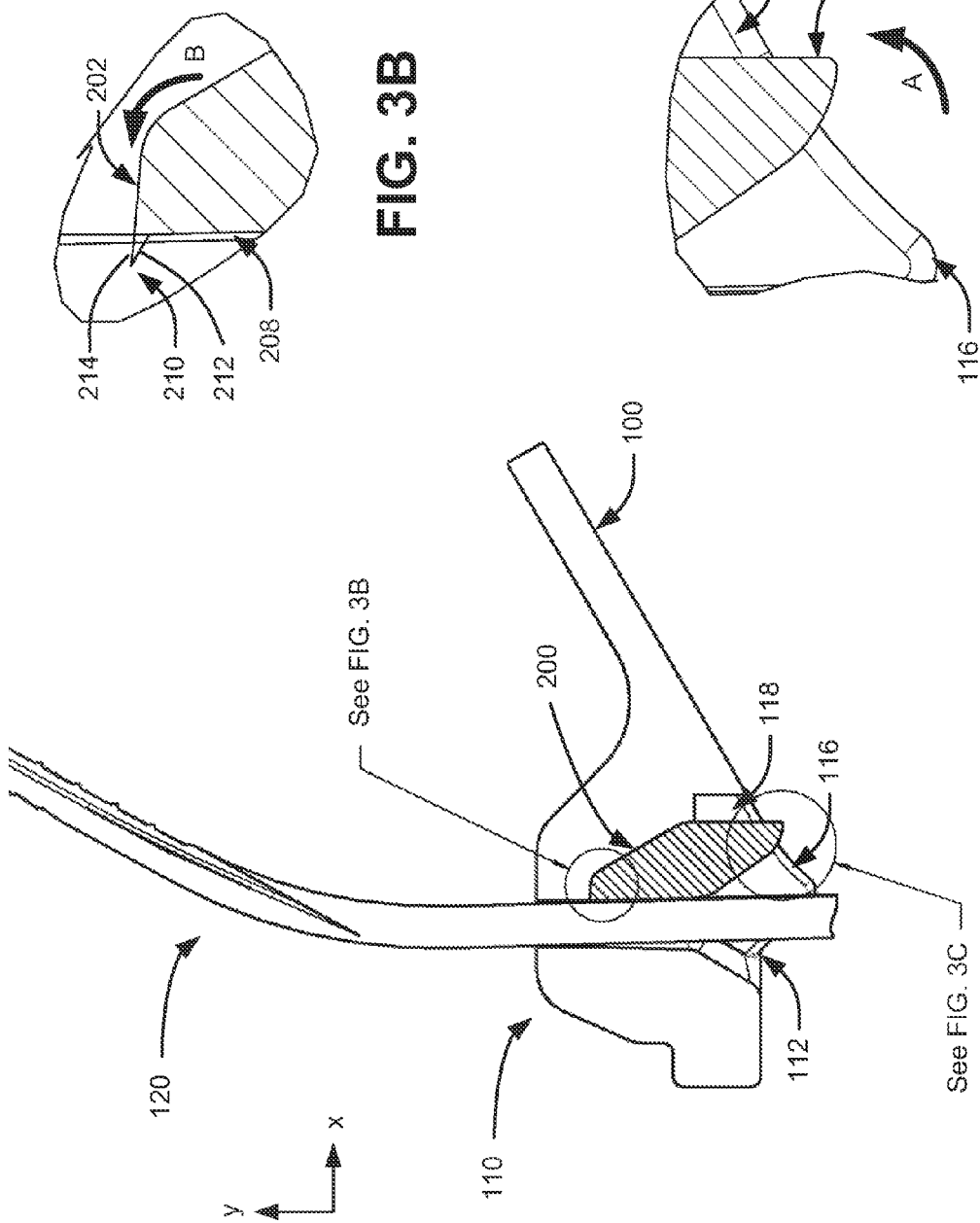

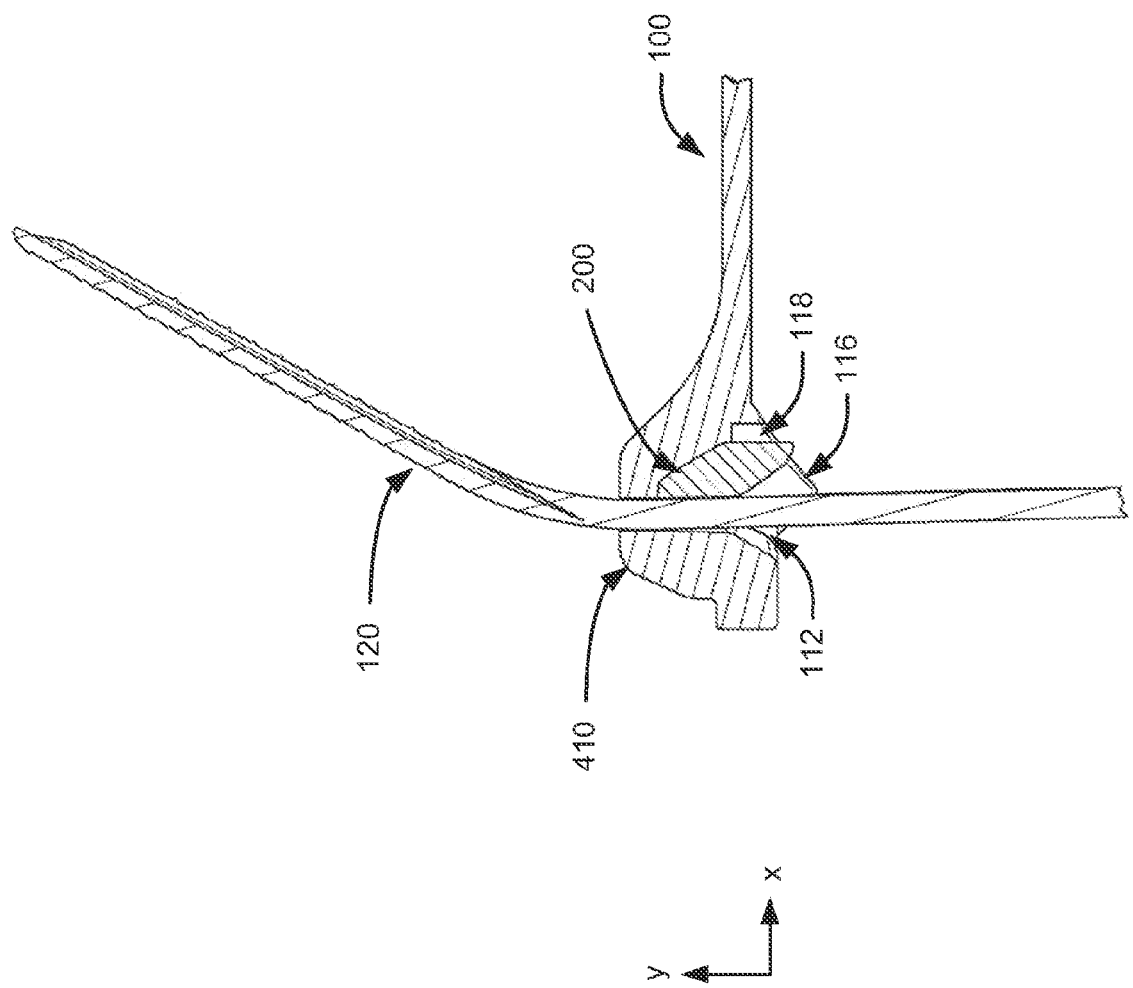

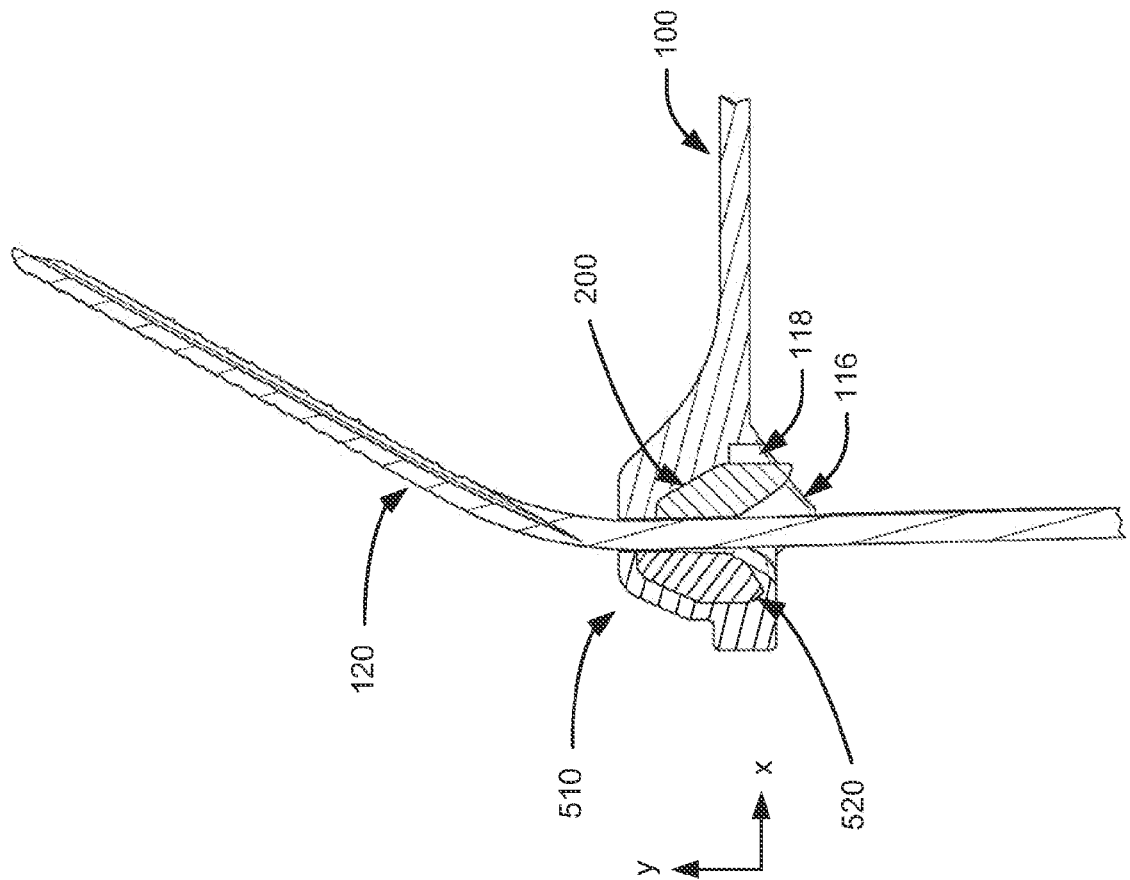

CABLE TIE WITH DISSIMILAR MATERIAL BARB

CROSS-REFERENCE TO RELATED APPLICATION

This application claims priority under 35. U.S.C. §119, based on U.S. Provisional Patent Application No. 61/541,455, filed Sep. 30, 2011, the disclosure of which is hereby incorporated by reference herein.

BACKGROUND INFORMATION

Wiring and cable bundling is an integral part of modern electrical and electronic installations. Cable ties are frequently used to bundle groups of cables and as well as secure objects in variety of other non-electrical applications. Generally, a cable tie may encircle a load (such as a cable bundle) so that a tail of the tie is inserted through a head of the tie. When inserted, the tail is secured within the head by a locking mechanism in the head of the cable tie.

BRIEF DESCRIPTION OF THE DRAWINGS

FIG. 3A provides a cross-sectional view of a head section of the cable tie of FIG. 1 according to an implementation described herein;

FIGS. 3B and 3C provide detailed views of portions of the head section of the cable tie of FIG. 3A;

FIG. 4A provides a cross-sectional view of a head section of the cable tie of FIG. 1 according to another implementation described herein;

FIG. 5A provides a cross-sectional view of a head section of a double-barbed cable tie according to still another implementation described herein;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a cable tie with a barb of a dissimilar material that provides increased holding force over conventional cable ties made from a single material. The cable tie body and the barb may be constructed using a multi-shot injection molding process.

Single material cables ties typically provide limited hold strength since the material strength of the locking mechanism (e.g., an integrated barb) is limited by the requirement for flexibility of the overall cable tie. Two-piece cable ties have been used to provide a stronger holding mechanism within the softer material of the cable tie body. For example, some conventional two-piece cable ties employ a steel barb embedded in a softer base material, such as nylon. Insertion of the steel barb for these cable ties requires a second step during the manufacturing process to inject the barb into a head portion of the nylon cable tie body. Insertion of the steel barb is a sensitive operation. Any variations in moisture, the nylon temperature, insertion angle, or insertion depth may affect the quality and/or performance of the assembled two-piece cable tie. Furthermore, steel is undesirable in some cable tie applications. Thus, it is desirable to provide a cable tie that includes the benefits of the two-piece configuration while eliminating the sensitive steel barb insertion process.

In an implementation described herein, a cable tie may include a barb of a first material, the barb including a tail engagement segment and an axle, and a body of a second material that is molded over the first material. The body may include a tail section and a head section. The head section may include a support structure to secure the axle within the head section and an insertion channel to receive the tail section. At least a portion of the barb's tail engagement segment may extend into the insertion channel. When a force is exerted to remove the tail section from the insertion channel, the tail engagement segment may engage a surface of the tail section to prevent movement of the tail section in the direction of the force.

In another implementation, a method of making a cable tie may include injection-molding, in a first mold cavity, a barb of a first material and indexing the barb to a second mold cavity. In the second mold cavity, a cable tie body of a second material, different than the first material, may be injection-molded over the barb so that the barb is constrained within the cable tie body so as to permit rotational movement of the barb within the cable tie body.

Figure 1:
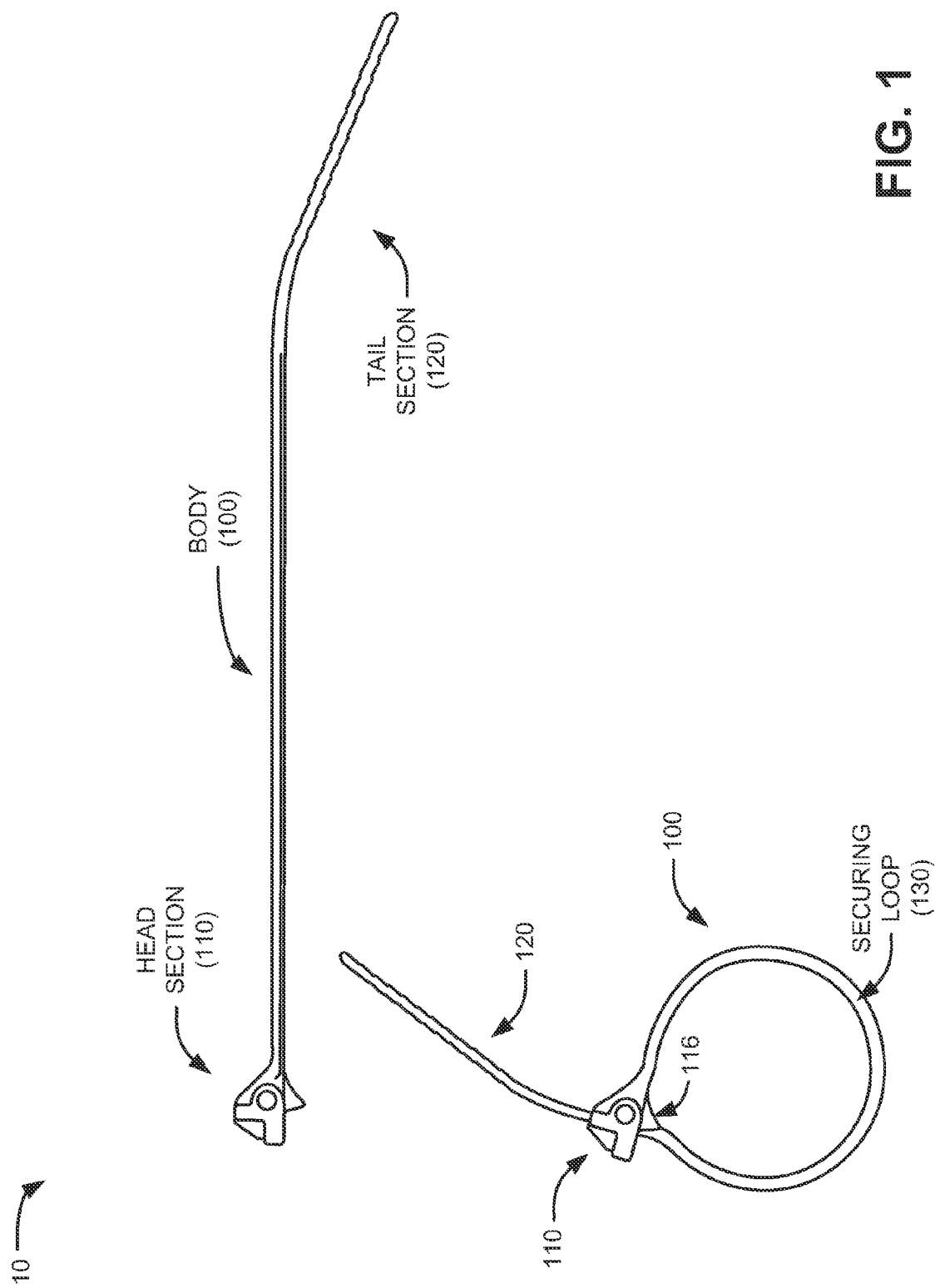
FIG. 1 is a side view of an unsecured cable tie and a secured cable tie according to an implementation described herein.

FIG. 1 provides side views of a cable tie 10 according to an implementation described herein. Referring to FIG. 1, cable tie 10 may include a body 100 having a head section 110 and a tail section 120. Tail section 120 may be inserted through a channel in head section 110 to create a securing loop 130 that may be used to secure a group of cables and/or other objects. Body 100 may be made of a material with sufficient flexibility to allow tail section 120 to be inserted into head section 110 and sufficient strength to secure objects within securing loop 130. For example, body 100 may be made of a polymer, such as nylon (e.g., nylon 6.6, nylon 12), polypropylene, polyethylene, or another thermoplastic material.

Head section 110 may be sized to receive tail section 120 and secure tail section within head section 110. Head section 110 is described in more detail below in connection with, for example, FIGS. 2-6. In one implementation, tail section 120 may include teeth, micro-teeth, nano directional adhesives, a stippled surface, or another form of a factional surface to permit insertion of tail section 120 into head section 110 and to minimize slippage of tail section 120 out head section 110.

Figure 2:
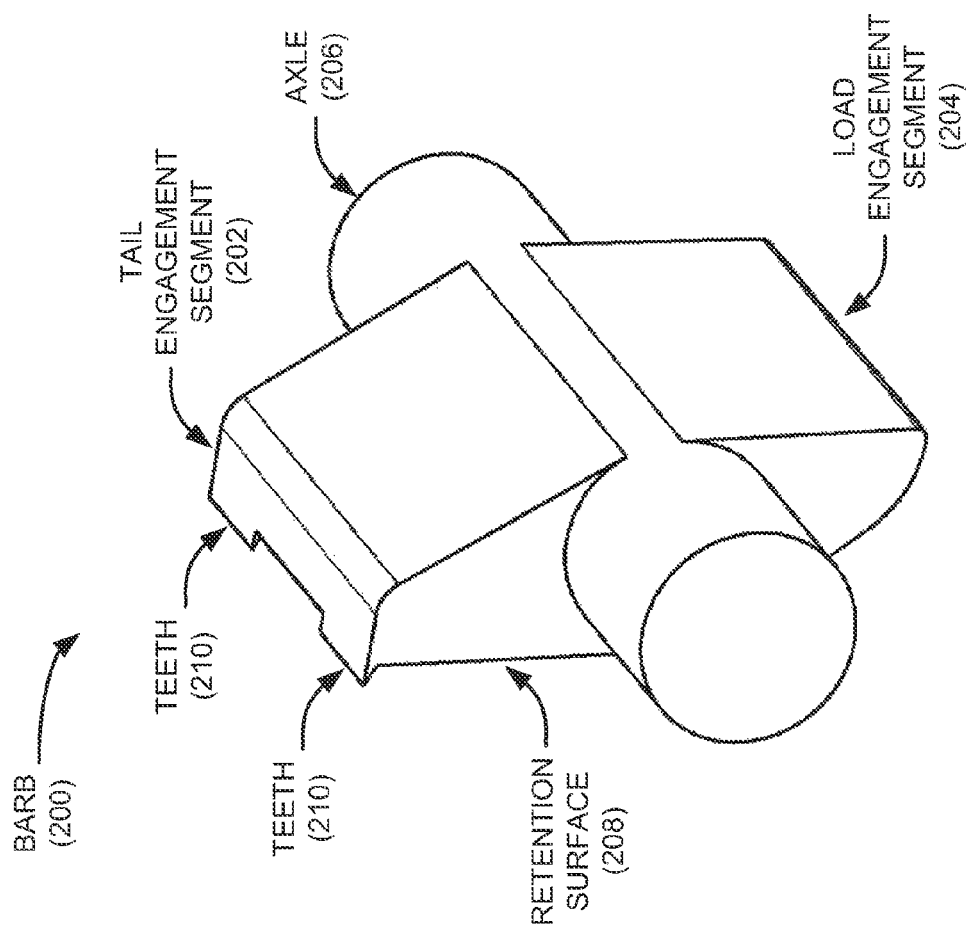
FIG. 2 provides an isometric view of a barb of the cable tie of FIG. 1.

FIG. 2 provides an isometric view of a barb 200 that may be included within head section 110 of body 100. For example, body 100 (e.g., including head section 110) may be molded over barb 200 to form cable tie 10. Barb 200 generally functions to retain tail section 120 within head section 110 against an extraction load. In contrast with the material of body 100, barb 200 may be made of a harder material (e.g., stiffer, more rigid, more resistant to deformation, etc.). The material of barb 200 may also have a higher melting point (e.g., melting temperature). For example, barb 200 may be formed of glass, glass-filled nylon, or a hard plastic, such as polyoxymethylene ("acetal"). In other implementations, barb 200 may include a metal material. As will be described further below, barb 200 may also include material properties that prevent bonding with the material of body 100. As shown in FIG. 2, barb 200 may include a tail engagement segment 202, a load engagement segment 204, an axle 206, a retention surface 208, and teeth 210. Features of barb 200 are described further in connection with FIGS. 3A-3D below.

Figure 3D:
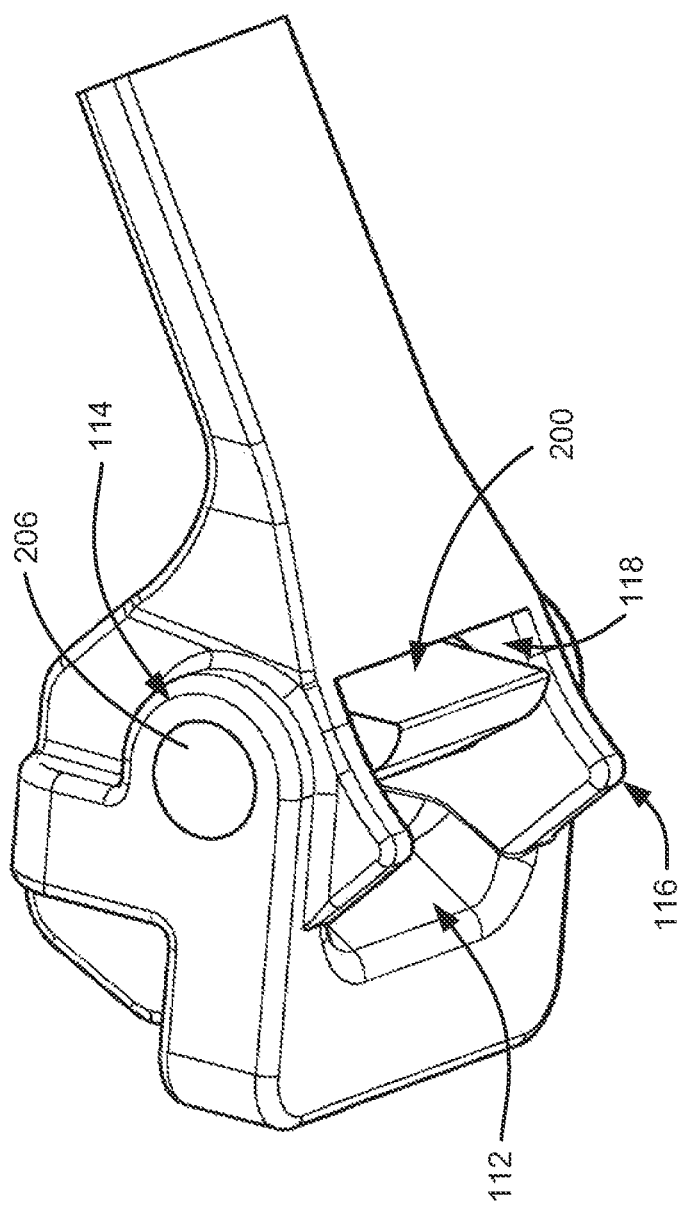
FIG. 3D provides an isometric view of the head section of the cable tie of FIG. 3A.

FIGS. 3A-3D provide views of head section 110 with barb 200. FIG. 3A provides a cross-sectional view of tail section 120 inserted through head section 110. In FIG. 3A, some cross-section lines have been removed from head section 110 for clarity. FIG. 3B provides a detailed cross-section view of a portion of barb 200 engaging tail section 120. FIG. 3C provides a detailed cross-section view of another portion of barb 200. FIG. 3D provides an isometric view of the underside of head section 110 without tail section 120 inserted. Referring collectively to FIGS. 3A-3D, head section 110 of body 100 may be molded over barb 200. Thus, cable tie 10 may generally include a two-piece construction with body 100 and barb 200.

Head section 110 may include an insertion channel 112, a barb support 114, shoulder extensions 116, and a deflection cavity 118. Insertion channel 112 may include a conduit through the depth (e.g., along the y-axis, as shown in FIG. 2A) of head section 110. Insertion channel 112 may generally be sized to receive tail section 120 and may accommodate a maximum cross-sectional area of tail section 110 (e.g., with a nominal clearance). Insertion channel 112 may be configured in any one of a variety of angles. In one implementation, for example, insertion channel 112 may be aligned in a substantially perpendicular orientation to that of body 100. In another implementation, as shown in FIG. 3A, head 110 and/or insertion channel 112 may be tilted (e.g., approximately 30 degrees from perpendicular).

Barb support 114 may be formed to secure barb 200 within head section 110. For example, barb support 114 may form a hollow section within head section 110 to receive axle 206 and to support barb 200 within head section 110. Barb support 114 may allow axle 206 to rotate within barb support 114, allowing tail engagement segment 202 of barb 200 to tilt into or out of insertion channel 112.

Shoulder extensions 116 may include a portion of head 110 that extends on one or both sides of deflection cavity 118 (e.g., on either side of barb 200) into the inner circumference of securing loop 130 (FIG. 1). Shoulder extension 116 may, for example, include one or more substantially V-shaped protrusions extending down from either a side or bottom of head section 110. Shoulder extension 116 may increase the surface area of securing loop 130 that contacts a load (e.g., a group of cables, etc.) to improve the circumferential grip of cable tie 10.

Deflection cavity 118 may include a cavity within head section 110, between shoulder extensions 116, that is generally the width (e.g., along the x-axis, as shown in FIG. 2B) of barb 200 (e.g., with a nominal clearance) to facilitate rotation of barb 200 into insertion channel 112 (e.g., caused by an extraction load on tail section 120 passing through insertion channel 112). Deflection cavity 118 may also permit load engagement segment 204 of barb 200 engage a load (e.g., within securing loop 130).

Figure 10:
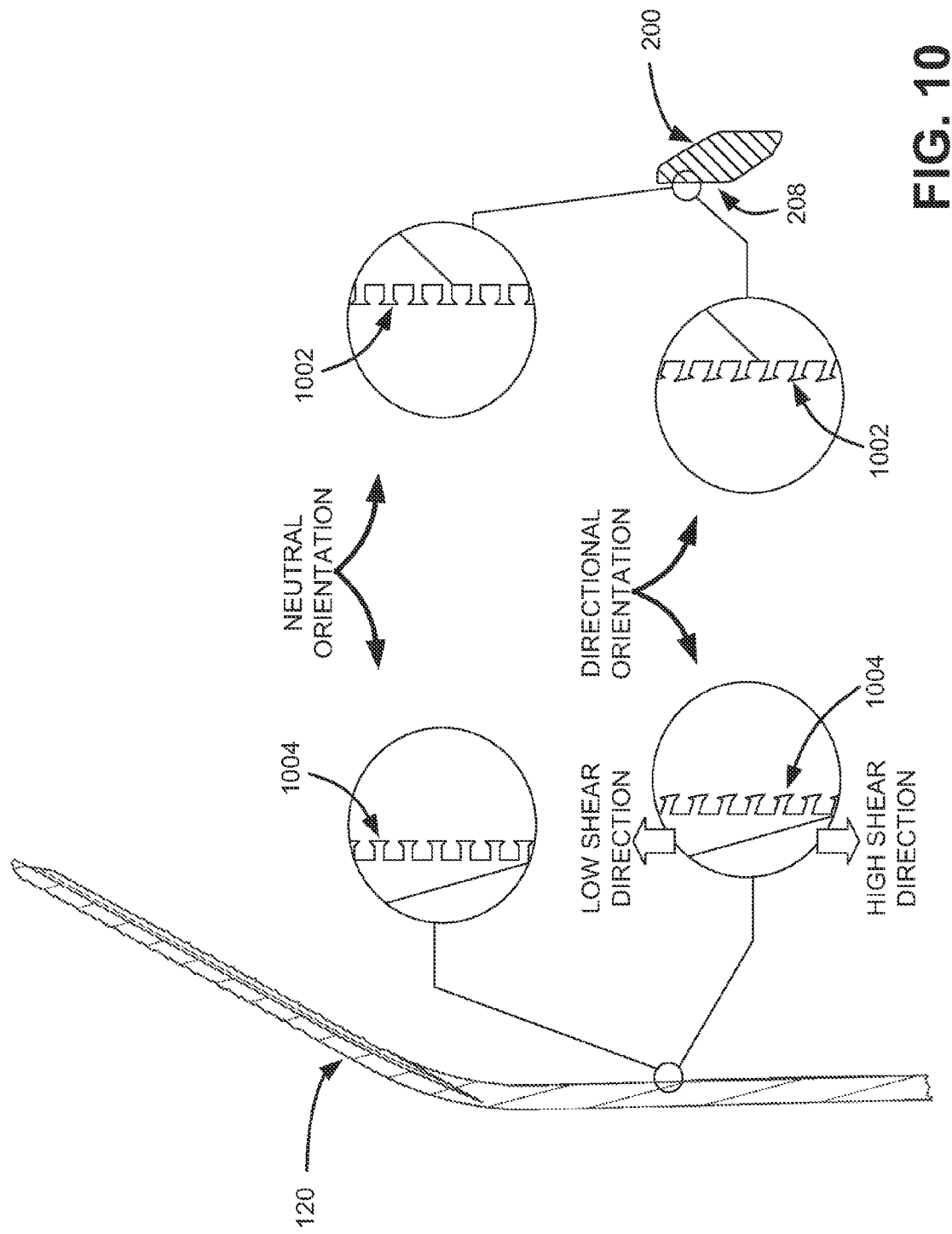
FIG. 10 provides enlarged cross-sectional views of exemplary factional surfaces of the barb and the tail section of the cable tie of FIG. 1.

Barb 200 may be supported within head 110 such that retention surface 208 of barb 200 is aligned substantially parallel to insertion channel 112. In one implementation, retention surface 208 may include micro-teeth, nano directional adhesives, a roughened surface, or another form of a frictional surface to minimize slippage (e.g., slippage of tail section 120 under an extraction load). FIG. 10 provides an enlarged view of retention surface 208 and tail section 120 with exemplary frictional surfaces. As shown in FIG. 10, retention surface 208 may include nano fibers 1002 that may be configured to engage corresponding nano fibers 1004 on a surface of tail section 120. Nano fibers 1002 and 1004 may be configured with neutral orientations or directional orientations. In a directional orientation, nano fibers 1002 and/or nano fibers 1004 may be angled to provide a lower shear (and resulting lower required insertion force) for insertion of tail section 120 into insertion channel 112 and a higher shear (and resulting higher retaining force) for removal of tail section 120 from insertion channel 112. Although nano fibers 1002 and 1004 are shown as being generally the same size (e.g., about 100 nanometers long), in other implementations, nano fibers 1002 may be of a different size than nano fibers 1004.

Returning to FIGS. 3A-3D, in one implementation, teeth 210 may be configured to extend into insertion channel 112 so as to engage tail section 120 in insertion channel 112. Teeth 210 may generally be configured with a sloped surface 212 (e.g., in relation to surface 208) oriented at an angle to permit an object (e.g., tail section 120) to slide past barb 200 (e.g., through insertion channel 112) in one (e.g., insertion) direction. Conversely, teeth 210 may be configured with a surface 214 (e.g., essentially perpendicular in relation to surface 208) to engage the object (e.g., tail section 120) attempting to slide past barb 200 in an opposite (e.g., loaded) direction. While a single set of teeth 210 are shown in FIG. 2 at the top of tail engagement segment 202, in other implementations multiple teeth 210 may be included at other locations along surface 208.

In operation, tail section 120 may be inserted through insertion channel 112 to form securing loop 130. During insertion, tail section 120 may slide past retention surface 208 and sloped surface 212 due to the directed frictional surfaces of tail section 120 and/or retention surface 208. Tail section 120 may be inserted, for example, until securing loop 130 contacts a load (not shown). As the force of the load begins to exceed the insertion force on tail section 120, friction between tail section 120 and retention surface 208 may cause tail engagement segment 202 to rotate into insertion channel 112. Thus, tail engagement segment 202/teeth 210 of barb 200 may dig into tail section 120 to prevent movement in the loaded direction (e.g., preventing extraction of tail section 120 from head section 110).

Also, as securing loop 130 closes around the load, the load may contact load engagement segment 204 of barb 200. The load may impart a force against load engagement segment 204, causing barb 200 to rotate slightly in direction "A" (FIG. 3C) within deflection cavity 118. Rotation of barb 200 caused by the load also causes tail engagement segment 202 to rotate in the same direction (shown as direction "B" in FIG. 3B). Rotation of tail engagement segment 202 may cause teeth 210 to engage tail section 120 within insertion channel 112. As securing loop continues to tighten around the load, the force on load engagement segment 204 is translated to tail engagement segment 202 to further secure tail section 120.

Figure 4B:
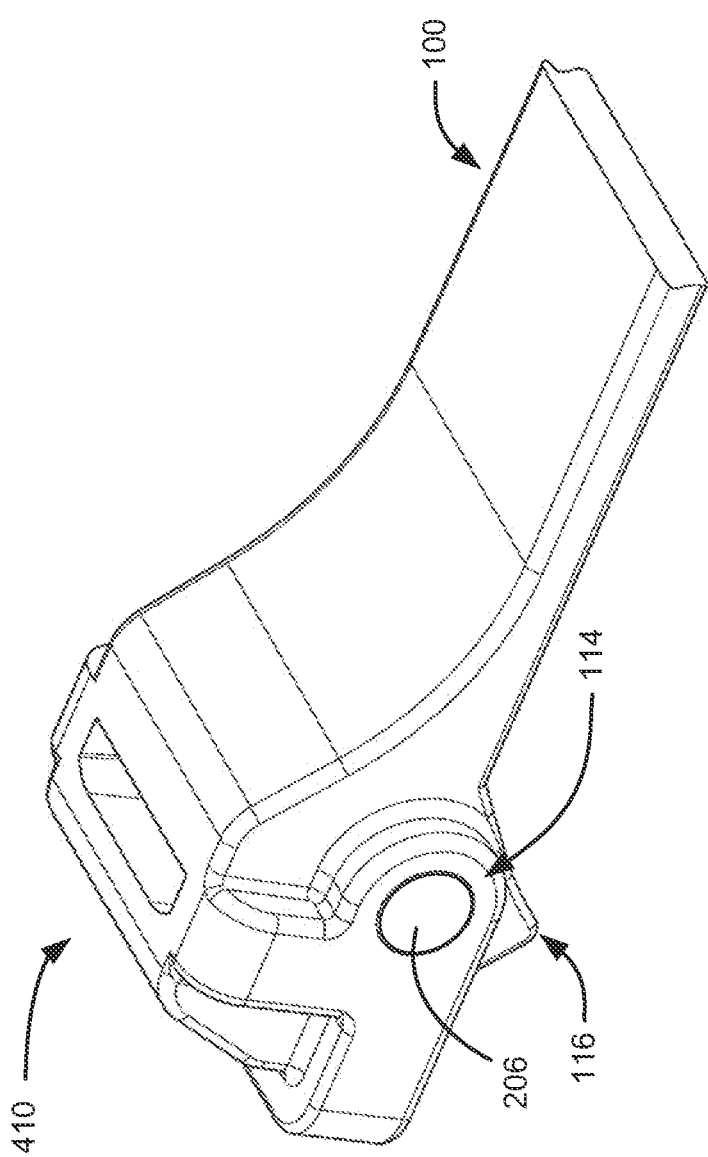
FIG. 4B provides an isometric view of the head section of the cable tie of FIG. 4A.

FIGS. 4A and 4B provide views of a head section 410 with a barb 200 according to another implementation. FIG. 4A provides a cross-sectional view of tail section 120 inserted through head section 410. FIG. 4B provides an isometric view of the topside of head section 410 without tail section 120 inserted. Referring collectively to FIGS. 4A and 4B, head section 410 may include insertion channel 112, barb support 114, shoulder extension 116, and deflection cavity 118. Head section 410 may also include barb 200 molded into head section 410 of body 100. The configuration of FIGS. 4A and 4B is similar to that described above for head section 110 in connection with FIGS. 3A-3D, with the exception that insertion channel 112 is shown aligned in a substantially perpendicular orientation (e.g., along the Y-axis) to that of body 100 (e.g., along the X-axis).

Figure 5B:
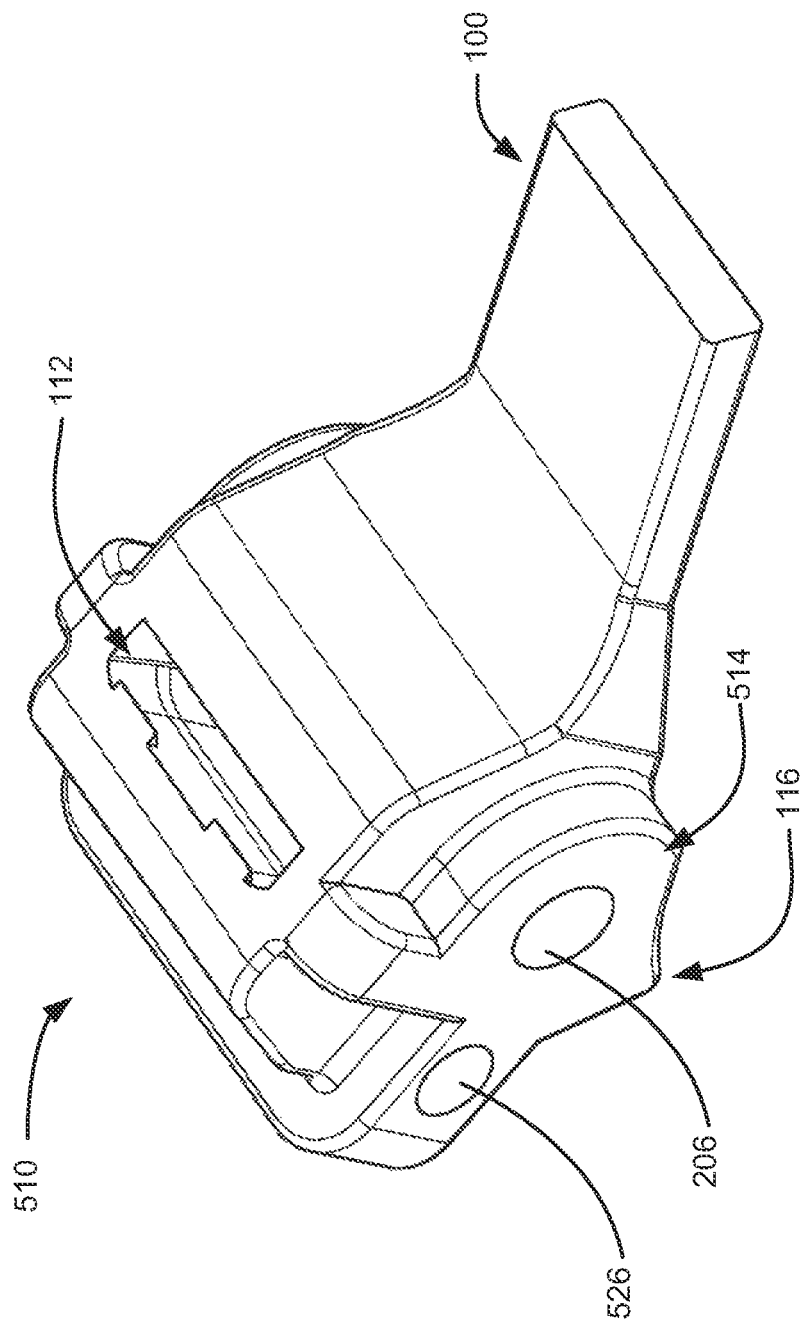
FIG. 5B provides an isometric view of the head section of the cable tie of FIG. 5A.

FIGS. 5A and 5B provide views of a head section 510 with two barbs according to another implementation. FIG. 5A provides a cross-sectional view of tail section 120 inserted through head section 510. FIG. 5B provides an isometric view of the topside of head section 510 without tail section 120 inserted. Referring collectively to FIGS. 5A and 5B, head section 510 may include insertion channel 112, shoulder extension 116, deflection cavity 118, and barb support 514. Head section 510 may also include barb 200 and a secondary barb 520 molded into head section 510 of body 100.

Figure 6:
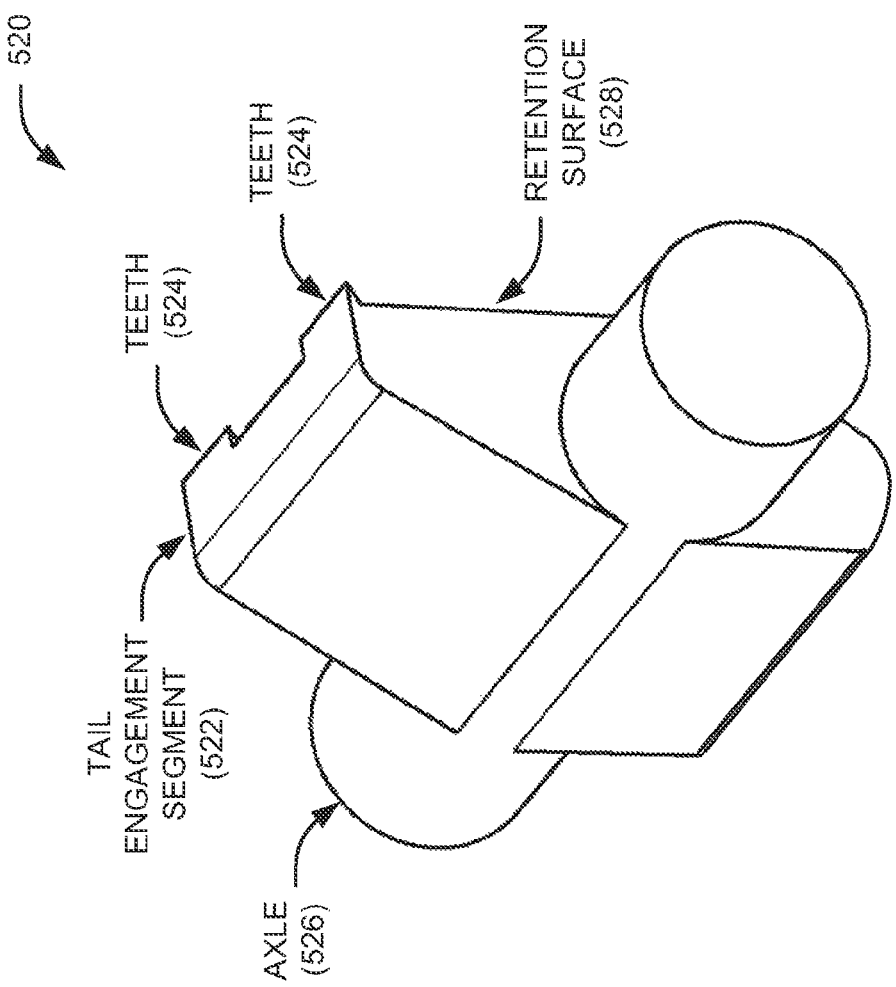
FIG. 6 provides an isometric view of a secondary barb of the cable tie of FIG. 5A.

FIG. 6 provides an isometric view of secondary barb 520. In one implementation, secondary barb 520 may be configured as a mirror image of barb 200, with the exception that secondary barb 520 may not include a component corresponding to load engagement segment 204 of barb 200. Thus, as shown in FIG. 6, secondary barb 520 may include a tail engagement segment 522, teeth 524, an axle 526, and a retention surface 528. Tail engagement segment 522, teeth 524, axle 526, and retention surface 528 may include features similar to tail engagement segment 202, teeth 210, axle 206, and retention surface 208 of barb 200. Secondary barb 520 may also include similar width dimensions to that of barb 200.

Referring again to FIGS. 5A and 5B, insertion channel 112, shoulder extension 116, deflection cavity 118, and barb 200 of head section 510 may include features similar to those described above for head section 110 in connection with, for example, FIGS. 3A-3D. For the two barb configuration of FIGS. 5A and 5B, head 510 and/or insertion channel 112 may be oriented in either a substantially perpendicular orientation (e.g., along the Y-axis) to that of body 100 (e.g., along the X-axis), as shown in FIG. 5A, or an angled orientation, as shown in FIG. 5B.

Barb support 514 may be formed to secure barb 200 and secondary barb 520 within head section 510 on opposite sides of insertion channel 112. For example, barb support 514 may form a hollow section within head section 510 to receive two axles—axle 206 of barb 200 and axle 526 of secondary barb 520. In one implementation, barb support 514 may be configured to align axle 206 and axle 526 at the same height (e.g., with respect to the Y-axis of FIG. 5A) along either sided of insertion channel 112. In other implementations, barb support 514 may be configured to align axle 206 and axle 526 at different heights (e.g., staggered height respect to the Y-axis of FIG. 5A). In still other implementations, barb support 514 may be configured to align axle 206 and axle 526 at the same height, with barb 200 and secondary barb 520 having different sizes to create staggered engagement points with tail section 120.

Body 100 may be molded over barb 200 and secondary barb 520. Barb 200 and secondary barb 520 may generally function to retain tail section 120 within head section 510 against an extraction load. In one implementation, secondary barb 520 may be made of the same material as barb 200. In other implementations, secondary barb 520 may be made of a different material that either barb 200 or body 100. As with barb 200, secondary barb 520 may also include material properties that prevent bonding with the material of body 100.

When using head section 510 for cable tie 10, tail section 120 may be inserted through insertion channel 112 to form securing loop 130, similar to that shown in FIG. 1. During insertion, tail section 120 may push past retention surface 208 of barb 200 and retention surface 528 of secondary barb 520. Tail section 120 may be inserted, for example, until securing loop 130 contacts a load (not shown). As the force of the load begins to exceed the insertion force on tail section 120, tail section 120 may begin to pull out of insertion channel 112 and teeth 210 of barb 200 and teeth 524 of secondary barb 520 may dig into opposite sides of tail section 120 to prevent movement in the loaded direction (e.g., preventing extraction of tail section 120 from head section 510). Also, as securing loop 130 closes around the load, the load may contact load engagement segment 204 of barb 200. The load may impart a force against load engagement segment 204, causing tail engagement segment 202/teeth 210 of barb 200 to apply additional force to engage tail section 120 within insertion channel 112 (e.g., tail engagement segment 202 of barb 200 rotates further into insertion channel 112).

Figure 7A:
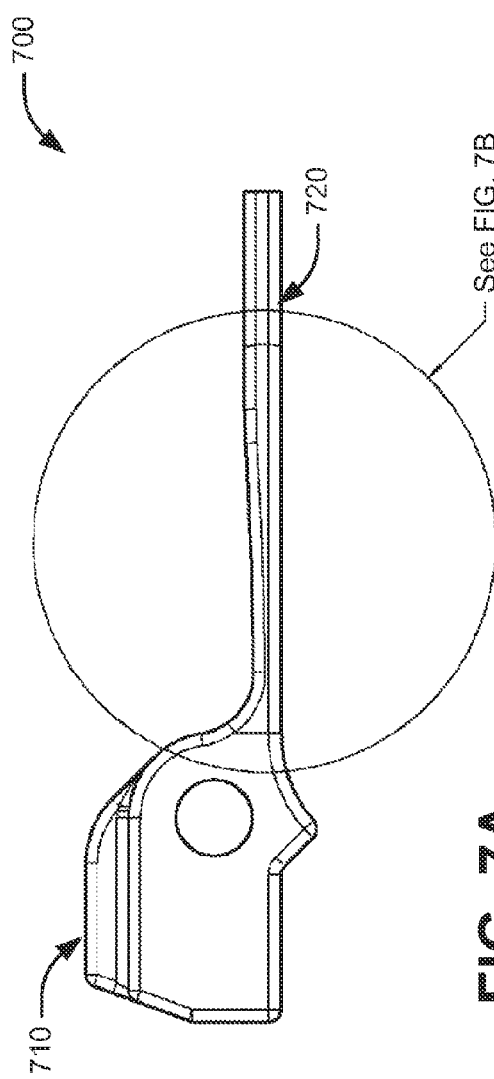
FIGS. 7A and 7B provide a side view of a body section of a cable tie according to an implementation described herein.
Figure 7B:
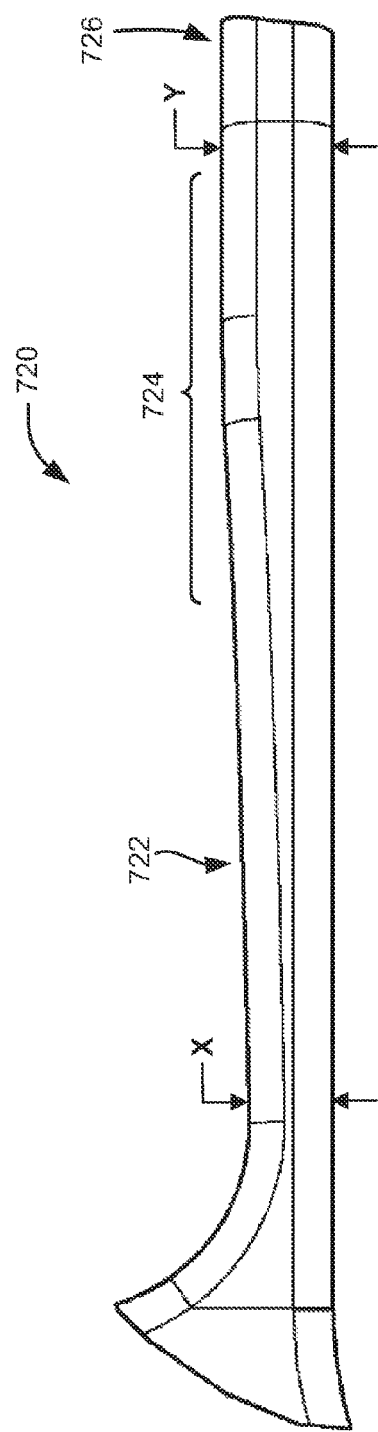
Figure 7C:
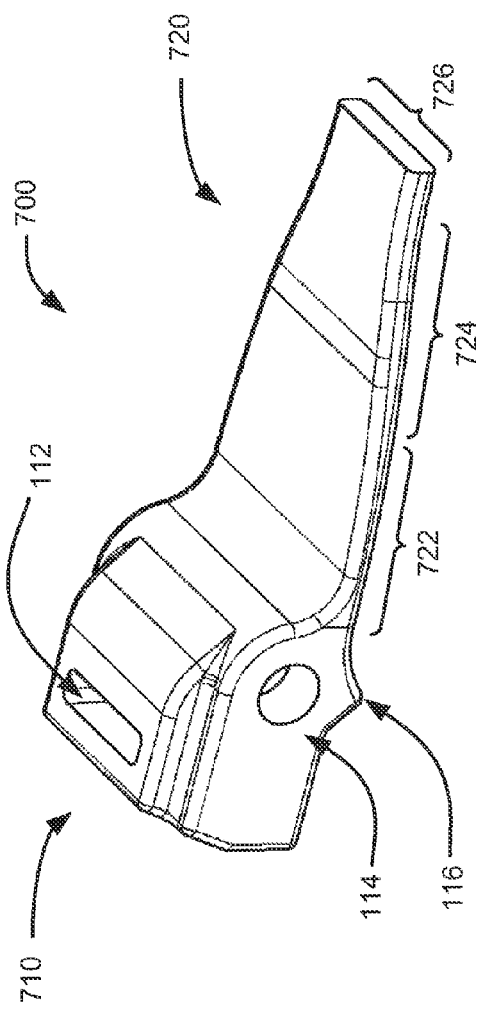
FIGS. 7C and 7D provide isometric views of the body section of FIGS. 7A and 7B.
Figure 7D:
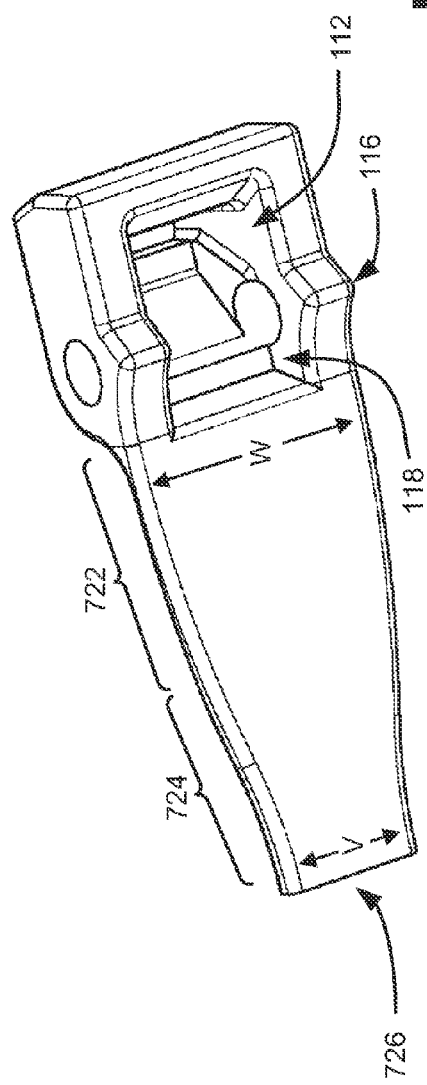

FIGS. 7A-7D provide views of a portion 700 of body 100 according to another implementation. FIG. 7A provides a side view of a portion 700 that includes head section 710 and tail section 720. FIG. 7B provides a detailed side view of a portion of tail section 720. FIG. 7C provides an isometric view of the topside of portion 700. FIG. 7D provides an isometric view of the underside of portion 700. Portion 700 may be combined, for example, with features included in implementations of cable tie 10 described in connection with FIGS. 1-6.

Referring collectively to FIGS. 7A-7D, head section 710 may include features similar to those of head section 110 or head section 510. That is, head section 710 may include a single barb or a double-barb configuration. However, in FIGS. 7A-7D, head section 710 is shown without barb 200 and/or barb 520. Head section 710 may include insertion channel 112, barb support 114/514, shoulder extensions 116, and deflection cavity 118. Additionally, insertion channel 112/head section 710 may be configured in any one of a variety of angles with respect to tail section 720.

Tail section 720 may include a reduced-thickness section 722 that extends from head section 710 to a transition section 724. Transition section 724 may connect reduced-thickness section 722 to a uniform-thickness section 726. Uniform thickness section 726 may extend toward a distal end (not shown in FIG. 7) of body 100 and may include a thickness, Y, and a width, V, to permit insertion of tail section 720 into insertion channel 112 of head section 710.

Reduced-thickness section 722 may include a first thickness, X, that is less than the thickness, Y, of uniform-thickness section 726. Reduced-thickness section 722 may also have a width, W, that is wider than the width, V, of uniform-thickness section 726. In one implementation, width W may be equal to the width of head section 710. Thus, reduced-thickness section 722 may include a different cross-section than that of uniform-thickness section 726. Reduced-thickness section 722 may gradually become narrower as reduced-thickness section 722 extends further from head section 710 toward transition section 724. Transition section 724 may gradually become thicker and narrower as transition section 724 extends further toward uniform-thickness section 726. In one implementation, the amount of material eliminated from the thickness X of reduced-thickness section 722 (e.g., in comparison to the thickness Y of uniform-thickness section 726) is the same as the amount of material added to the width W of reduced-thickness section 722 (e.g., in comparison to the width V of uniform-thickness section 726).

In contrast with the thickness Y of uniform-thickness section 726, the thickness X may provide greater flexibility/bending of reduced-thickness section 722 in forming a loop (e.g., loop 130) with cable tie 10. The greater flexibility/bending may reduce stress between head section 710 and tail section 720 when cable tie 10 is bundled around a load. The increased width W of reduced-thickness section 722 may provide for additional tensile load strength to, for example, compensate for the difference in thickness from uniform-thickness section 726.

Figure 8:
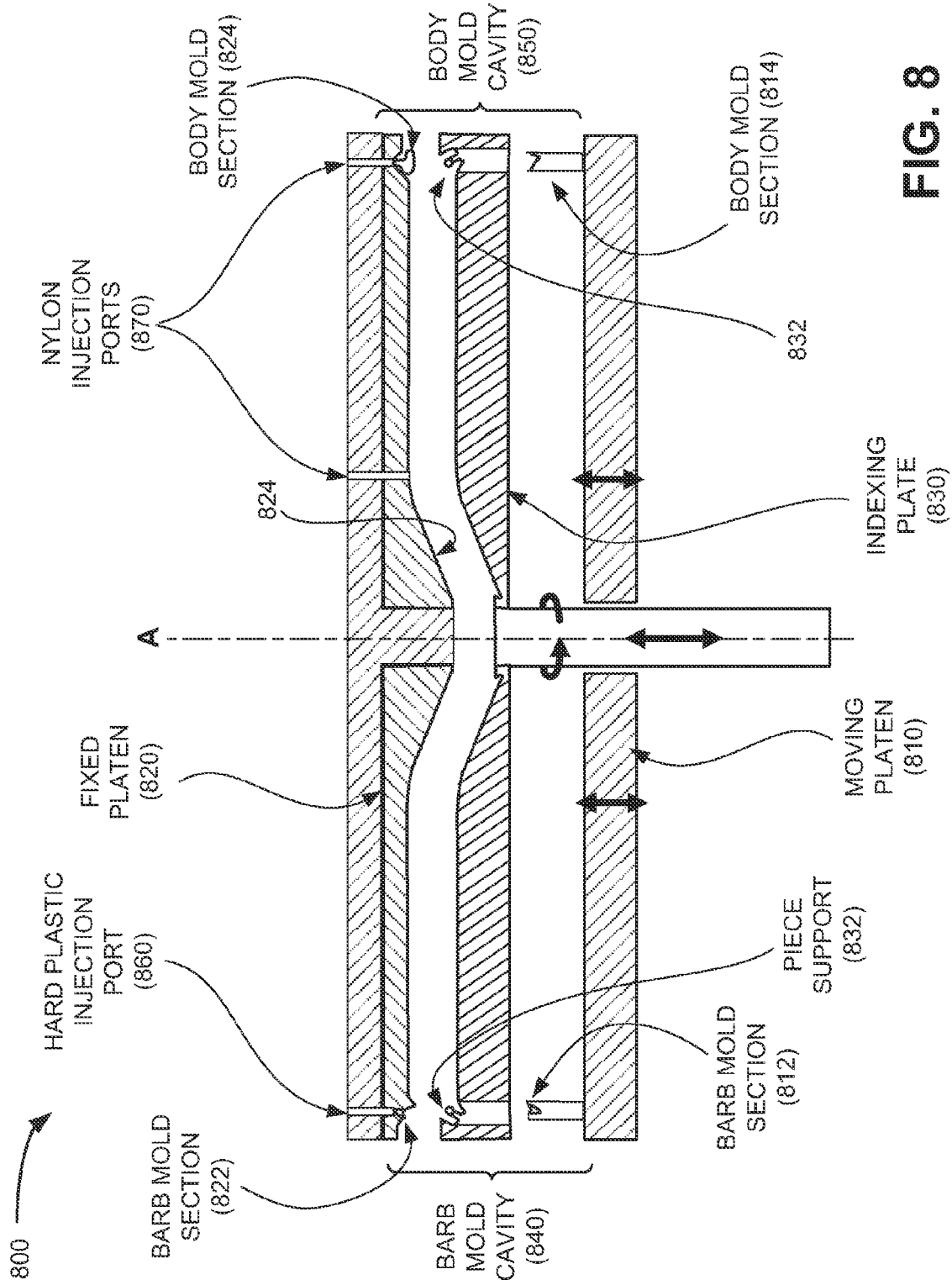
FIG. 8 provides a schematic of a multi-shot molding process for a cable tie according to an implementation described herein.

FIG. 8 includes a schematic of a multi-shot injection mold system 800 according to an implementation described herein. As shown in FIG. 8, multi-shot injection mold system 800 may include a moving platen 810, a fixed platen 820, and an indexing plate 830. Moving platen 810 may include a bottom barb mold section 812 and a bottom body mold section 814. Similarly, fixed platen 820 may include a top barb mold section 822 and a top body mold section 824. As described further herein, indexing plate 830 may include symmetrical sections to permit joining of bottom barb mold section 812 to top barb mold section 822 and bottom body mold section 814 to top body mold section 824.

Moving platen 810 may move axially, along axis A, as shown in FIG. 8. Indexing plate 830 may also move axially, along axis A, and rotate around axis A. Fixed platen 820 may remain stationary. When moving platen 810 is positioned against indexing plate 830 and indexing plate 830 is positioned against fixed platen 820, injection mold system 800 may form a barb mold cavity 840 and a body mold cavity 850. More particularly, as shown in FIG. 8, bottom barb mold section 812 and top barb mold section 822 may be joined to form barb mold cavity 840, while bottom body mold section 814 and top body mold section 824 may be joined to form body mold cavity 850. Barb mold cavity 840 may be configured to form a shape of a single barb (e.g., barb 200) or shapes of two separate barbs (e.g., barb 200 and secondary barb 520). Body mold cavity 850 may be configured to form a shape of body 100 including a head section to accommodate a single barb (e.g., head section 110 or 410) or to accommodate two barbs (e.g., head section 510). Thus, in the configuration of FIG. 8, barb mold cavity 840 may be structurally restricted to an area near an outer edge of index plate 830; while body mold cavity 850 may extend along most of the distance between axis A and an opposite outer edge of index plate 830.

A hard plastic injection port 860 may extend through fixed platen 820 to top barb mold section 822. Hard plastic injection port 860 may be sized to provide a flow of liquid plastic/glass into barb mold cavity 840. One or more nylon injection ports 870 may extend through fixed platen 820 to top body mold section 824. Nylon injection ports 870 may be sized to provide a flow of liquid nylon into body mold cavity 850.

Index plate 830 performs the function of switching partially completed components between the different mold cavities (e.g., by rotating a partially completed component from barb mold cavity 840 to body mold cavity 850). When moving platen 810 is disengaged from indexing plate 830 and indexing plate 830 is disengaged from fixed platen 820, indexing plate 830 may rotate to align piece supports 832 with either of barb mold cavity 840 or body mold cavity 850.

In operation, moving platen 810 can be moved to simultaneously close barb mold cavity 840 and body mold cavity 850. Molten material, such as acetal or another relatively rigid polymer, for a barb component (e.g., barb 200) may be injected through port 860 into barb mold cavity 840 and the material is allowed to cool. After the barb material within barb mold cavity 840 is cooled, moving platen 810 and index plate 830 may move to open barb mold cavity 840, and index plate 830 may rotate to align the cooled barb component with bottom body mold section 814 and top body mold section 824. After an initial barb section is complete, multi-shot injection mold system 800 may achieve a steady-state operation.

For subsequent moldings (e.g., under steady-state operation), barb mold cavity 840 and body mold cavity 850 may be closed, and different materials may be simultaneously provided via port 860 (e.g., for hard plastic material) and port 870 (e.g., for nylon). For example, multi-shot injection mold system 800 may heat the hard plastic material to a melting/injection temperature and inject the melted hard plastic material into barb mold cavity 840. At the same time, the nylon material may be heated to a different melting/injection temperature (e.g., below the melting point of the hard plastic material) and injected into body mold cavity 850. Thus, a new barb (e.g., another barb 200) may be formed in barb mold cavity 840, while a body (e.g., body 100) is molded over the previously-formed barb 200 in body mold cavity 850.

Both the partially-completed piece (e.g., the barb in barb mold cavity 840) and the completed piece (e.g., cable tie 10 with the body 100 molded over barb 200 in body mold cavity 850) may be allowed to cool. Moving platen 810 and index plate 830 may extend away from fixed platen 820 to open barb mold cavity 840 and body mold cavity 850. The completed component may be ejected from body mold cavity 850 and index plate 830 may rotate to position the cooled barb from barb mold cavity 840 to align with body mold cavity 850. Barb mold cavity 840 and body mold cavity 850 may be closed and the injection molding cycle may be repeated.

Figure 9:
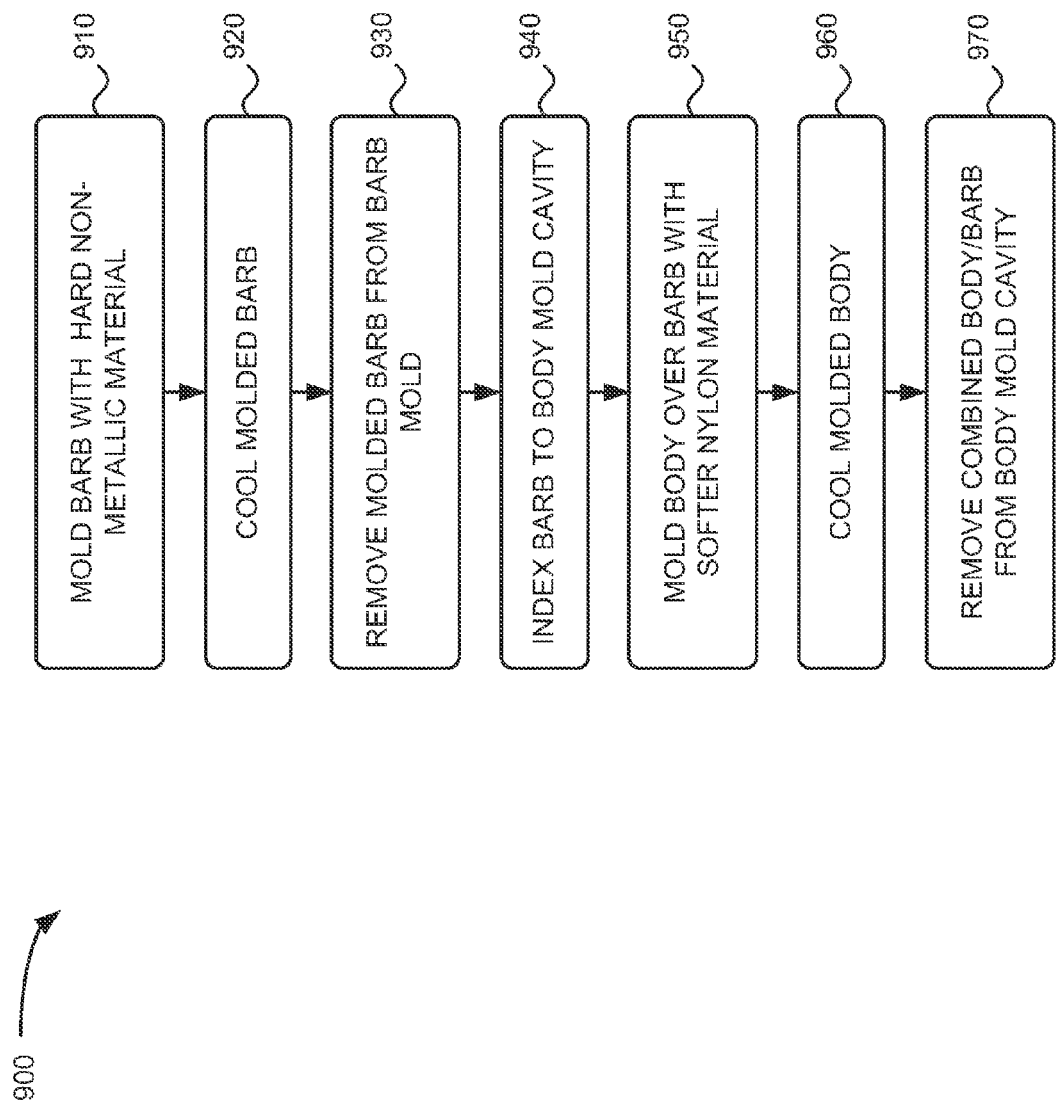
FIG. 9 is a flow chart of a process for making a cable tie according to an implementation described herein.

FIG. 9 is a flowchart of an exemplary process 900 for forming a cable tie with a dissimilar material barb, according to an implementation described herein. In one implementation, process 900 may be performed using a multi-shot injection molding system, such as multi-shot injection mold system 800. In another implementation, one or more blocks of process 900 may be performed by one or more other devices or a group of devices including or excluding multi-shot injection mold system 800.

Process 900 may include molding a barb with a hard non-metallic material (block 910), cooling the molded barb (block 920), and removing the molded barb from the barb mold (block 930). For example, as described above in connection with FIG. 8, multi-shot injection mold system 800 may move moving platen 810 to simultaneously close barb mold cavity 840 and body mold cavity 850. Molten material, such as acetal, may be injected through port 860 into barb mold cavity 840 to form, for example, barb component 200. The barb material may then be allowed to cool and harden. After the barb material within barb mold cavity 840 is cooled, moving platen 810 and index plate 830 may move to open barb mold cavity 840.

Process 900 may also include indexing the barb to a body mold cavity (block 940), molding a body, over the barb, with a softer nylon material (block 950). For example, as described above in connection with FIG. 8, multi-shot injection mold system 800 may rotate index plate 830 to align the cooled barb component with bottom body mold section 814 and top body mold section 824. Body mold cavity 850 may be closed, and a different molten polymer (e.g., nylon) may be injected via port 870. A body (e.g., body 100) may be molded over the previously-formed barb 200 in body mold cavity 850.

Process 900 may further include cooling the molded body (block 960), and removing the combined body/barb from the body mold cavity (block 970). For example, again referring to components of FIG. 8, the completed piece (e.g., cable tie 10 with the body 100 molded over barb 200 in body mold cavity 850) may be allowed to cool. Multi-shot injection mold system 800 may extend moving platen 810 from index plate 830 and may extend index plate 830 away from fixed platen 820 to open body mold cavity 850 (and barb mold cavity 840). The completed piece may be ejected from body mold cavity 850 and index plate 830.

In implementations described herein, a cable tie may include a body of a first flexible material molded over at least one barb of a second harder material. The body may include a head section configured to secure the barb in a configuration that permits rotational movement of the barb, permit insertion of a tail section into the head section, and prevent extraction of the tail section from the head section by engagement of the barb. In one implementation, the cable tie may be manufactured using a multi-shot molding process.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while some embodiments may eliminate the need for steel or metallic barbs, other embodiments may use a metallic barb and still implement features disclosed herein. Further, release mechanisms may be included to permit disengagement (e.g., rotation out of insertion channel 112) of barb 200 and/or secondary barb 520 when tail section 120 is in an loaded condition.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for making a cable tie, the method comprising:
   injection-molding, in a first mold cavity of a multi-shot injection mold system, a barb of a first material;
   indexing the barb from the first mold cavity to a second mold cavity of the multi-shot injection mold system; and
   injection-molding, in the second mold cavity and over the barb, a cable tie body of a second material, the second material being different than the first material, and the barb being constrained within the cable tie body so as to permit movement of the barb.

2. The method of claim 1, the cable tie body including a head section and a tail section, and the head section including an insertion channel to receive the tail section and retain the tail section in the insertion channel using the barb.

3. The method of claim 2, the barb including an axle around which the barb can rotate, and the head section including a support structure to secure the axle and a deflection cavity, adjacent to the insertion channel, to permit rotation of the barb.

4. The method of claim 1, the first material comprising one of glass or acetal, and the second material comprising a nylon material.

5. The method of claim 1, the second material and the first material being incompatible for bonding.

6. The method of claim 1, further comprising:
   after injection-molding the barb, cooling the barb; and
   removing the barb from the first mold cavity.

7. The method of claim 1, the injection-molding the cable tie body further comprising:
   heating the second material to an injection temperature below a melting point of the first material, and
   injecting the second material into the second mold cavity at the injection temperature.

8. The method of claim 1, wherein the first material is harder than the second material.

9. The method of claim 1, the injection-molding the barb of the first material further comprising injection-molding a secondary barb, along with the barb, in the first mold cavity.

10. The method of claim 1, the cable tie body including a head section and a tail section, and the tail section including a first portion, proximate to the head section, with a first thickness and a second portion, closer to a distal end of the tail section than the first portion, with a second thickness that is greater than the first thickness.

11. The method of claim 1, the first material comprising one of glass, glass-filled nylon, or polyoxymethylene.

12. The method of claim 2, the tail section including a first portion, proximate to the head section, and a second portion closer to a distal end of the tail section than the first portion, the first portion having a thickness less than that of the second portion and a width greater than that of the second portion.

13. The method of claim 2, the head section being configured to expose a portion of the barb to a load secured by the cable tie, such that a force exerted by the load on the barb is translated to a force by the barb on the tail section to prevent movement of the tail section.

14. The method of claim 2, wherein, when injection-molding, in the first mold cavity, the barb of the first material, the first mold cavity forms a first set of nano fibers on the barb, and
   wherein, when injection-molding, in the second mold cavity and over the barb, the cable tie body of the second material, the second mold cavity forms a second set of nano fibers on the tail section, the first set of nano fibers and the second set of nano fibers being configured to engage each other and resist extraction of the tail section from the head section.

15. The method of claim 1, wherein the multi-shot injection mold system includes:
   a first platen, a second platen, and an indexing plate between the first platen and the second platen, and
   wherein the first platen is positioned against the indexing plate and the indexing plate is positioned against the second platen to form the first mold cavity and the second mold cavity.

16. The method of claim 1, further comprising:
   injection-molding, in the first mold cavity, a secondary barb of the first material; and
   indexing the secondary barb to the second mold cavity, wherein injection-molding the cable tie body of the second material further includes simultaneously injection molding the cable tie body over the barb and the secondary barb.

17. A method for making a cable tie, the method comprising:
- injection-molding, in a first mold cavity of a multi-shot injection mold system, a barb of a first material;
- after injection-molding the barb, cooling the barb;
- heating a second material that is different than the first material to an injection temperature below a melting point of the first material,
- indexing the barb from the first mold cavity to a second mold cavity of the multi-shot injection mold system; and
- injection-molding, over the barb, a cable tie body of the second material, the second material being injected at the injection temperature into the second mold cavity, and the barb being constrained within the cable tie body so as to permit rotational movement of the barb.

18. The method of claim 17, the cable tie body including a head section and a tail section, and the head section including an insertion channel to receive the tail section and retain the tail section in the insertion channel using the barb.

19. The method of claim 18, the barb including an axle around which the barb can rotate, and the head section including a support structure to secure the axle and a deflection cavity, adjacent to the insertion channel, to permit rotation of the barb.

20. The method of claim 17, the first material comprising one of glass or acetal, and the second material comprising a nylon material.

* * * * *